United States Patent Office 3,057,810
Patented Oct. 9, 1962

3,057,810
POLYETHYLENE CONTAINING UNSATURATED MONOESTERS
James E. Guillet, Robert L. Combs, and Clarence E. Tholstrup, Kingsport, Tenn., assignors to Eastman Kodak Company, Rochester, N.Y., a corporation of New Jersey
No Drawing. Filed Feb. 27, 1958, Ser. No. 717,831
4 Claims. (Cl. 260—23)

This application relates to polyethylene compositions of improved properties. Specific aspects of this invention relate to polyethylene compositions, particularly in film form, having improved properties with respect to blocking and co-efficient of friction.

It has been known for some time that one of the major drawbacks of thin films of polyethylene is a high film-to-film coefficient of friction, which often prevents the feeding of single sheets to automatic packaging equipment. Another disadvantage of thin films of polyethylene is the tendency for these films to block. Blocking is the adherence of two or more film surfaces to each other while stacked under pressure.

It is an object of this invention to provide a novel polyethylene composition which possesses reduced film-to-film coefficient of friction.

It is another object of this invention to provide a new polyethylene composition which, upon conversion into films and sheets, possesses improved resistance to blocking.

Other objects of this invention will be apparent from the detailed description appearing hereinbelow.

The present invention comprises polyethylene compositions having incorporated therein minor proportionate amounts of a glyceryl monoester, the glyceryl monoester being at least 40% by weight of monoesters of unsaturated fatty acids containing 18 carbon atoms.

The glyceryl monoesters employed in the polyethylene compositions of the present invention consist essentially of monoesters of higher fatty acids having 16–18 carbon atoms, with at least 40%, and preferably at least 70%, by weight of the monoesters being monoesters of unsaturated hydroxy-free fatty acids containing 18 carbon atoms. Such glyceryl monoesters can be readily prepared by the interesterification of a suitable triglyceride or fatty acid with a molar excess of glycerol in the presence of an interesterification catalyst and the monoester separated in accordance with usual practice. Suitable triglycerides that can be employed to prepare the glyceryl monoesters of the invention include those triglycerides in which the fatty acid moiety therein comprises at least 40% by weight of unsaturated hydroxy-free fatty acids containing 18 carbon atoms. Typical triglycerides that can be employed are such vegetable oils as corn oil, soybean oil, cottonseed oil, peanut oil, linseed oil, olive oil, safflower oil, tung oil, and related unsaturated triglyceride oils. Such triglycerides as castor oil which have substantial amounts of hydroxyl group-containing fatty acids, such as ricinoleic acid, are not employed in the present invention. Suitable fatty acids that can be esterified with glycerol to prepare the subject glyceryl monoesters used in the invention, include oleic acid, linoleic acid, linolenic acid, eleostearic acid and the like.

In general, the proportion of glyceryl monoester used in polyethylene compositions to achieve the desirable reduction in the coefficient of friction and blocking is within the range of about 0.01–0.5%, based on the weight of the polyethylene. For optimum improvement in the polyethylene properties, the subject glyceryl monoesters are incorporated in polyethylene compositions in amounts within the range of 0.01–0.2% by weight based on the polyethylene.

Any of the known normally-solid polyethylene compositions can be improved in accordance with the invention, including "low density" and "high density" polyethylene. Conventional polyethylene, "low density" polyethylene, usually has a density of about 0.91 to 0.93 and can be prepared by several methods including the method disclosed by Fawcett et al. in U.S. Patent No. 2,153,553, issued April 11, 1939. "High density" polyethylene has a density of about 0.94 to 0.97 and can be prepared by such methods as are disclosed in copending application, Coover U.S. Serial No. 559,536, which was filed January 17, 1956, and by other methods known in the art. The invention is especially adapted for improving normally solid polyethylene having an average molecular weight in excess of about 15,000 and preferably in excess of about 20,000.

The present polyethylene compositions can be prepared by any method suitable for insuring a substantially uniform mixture of polyethylene and the subject glyceryl monoester in the final fabricated article. The glyceryl monoester can be conveniently incorporated into the polyethylene by melt blending the ingredients in conventional apparatus, such as a Banbury mixer, heated rolls, a plasticator, or in combinations thereof.

One of the advantages of polyethylene compositions, containing the present glyceryl monoesters, is that such compositions allow the production of films, sheets, tubes and other shaped articles having reduced coefficients of friction. Such a reduced coefficient of friction facilitates many commercial operations, such as the feeding of polyethylene films and sheets into packaging apparatus, for example.

Another advantage achieved by the use of small amounts of the subject glyceryl monoesters in polyethylene is in that films of polyethylene containing these monoesters have a reduced tendency toward blocking, namely, a reduced tendency of two or more films of the polyethylene from adhering to one another while stacked under pressure.

Although the compositions of this invention are composed essentially of polyethylene containing small amounts of the subject glyceryl monoesters, the compositions may also contain small amounts of other desirable additives, such as high melting waxes, antioxidants, dyes and pigments, antistatic agents, and the like, provided the additional ingredients are not present in amounts sufficient to alter the efficacy of the monoester.

The polyethylene compositions herein disclosed and claimed are particularly useful in plastic films having thicknesses of 0.5 to 100 mils, for example. The compositions may also be cast, extruded or molded into sheets, rods, tubes and piping, filaments and other shaped articles. The compositions may also be used for coating paper, cloth, wire, metal foil, glass fiber fabrics, synthetic and natural textiles and other substrates.

The invention is illustrated by the following examples of preferred embodiments thereof.

Various glyceryl monoesters in varying amounts were incorporated into polyethylene having a molecular weight of about 22,000 and a density of about 0.924. The glyceryl monoesters were dissolved in isopropyl alcohol and coated on the surface of polyethylene pellets. The isopropyl alcohol was removed by drying in a circulating air oven at 50° C., and the pellets were then extruded into tubular films using a die temperature of 160° C. The films were approximately 1.5 mils in thickness. Samples of the films containing the various glyceryl monoesters of the invention were tested for slip, or coefficient of friction, and resistance to blocking. The results of the tests are summarized in the table set out below.

TABLE

*Effect of Glyceryl Esters of Fatty Acids Upon Blocking and Coefficient of Friction of Polyethylene Films*

| Concn., percent | Additive | Coefficient of Friction | Blocking | | |
|---|---|---|---|---|---|
| | | | As Extruded | ASTM | Storage |
| 0 | None | >0.60 | 4 | 6 | 4 |
| 0.01 | Glyceryl monooleate | 0.52 | 4 | 5 | 5 |
| 0.1 | ----do---- | 0.41 | 4 | 5 | 5 |
| 0.5 | ----do---- | 0.15 | 3 | 4 | 6 |
| 0.1 | Glyceryl "monooleate" (from corn oil) | 0.51 | 3 | 4 | 4 |
| 0.1 | Glyceryl "monolinoleate" (from soybean oil) | 0.31 | 4 | 3–4 | 4 |
| 0.1 | Glyceryl monoricinoleate | >0.60 | 5 | 4–5 | 5 |
| 0.1 | Glyceryl monostearate (C$_{18}$ Satd.) | >0.60 | 4 | 6 | 4 |

The glyceryl monooleate from corn oil and the glyceryl monolinoleate from soybean oil additives in the above table were monoglycerides containing the fatty acids of corn oil and soybean oil respectively. As can be observed from the data set out in the table, the addition of the present glyceryl monoesters of unsaturated fatty acids containing 18 carbon atoms to polyethylene reduces the coefficient of friction and increases the resistance to blocking of films thereof.

To determine the coefficients of friction set out in the table, a strip of the polyethylene film was pulled underneath a flat-bottomed block weighing 466 grams and having a film of the polyethylene fastened around it at a constant speed of 10 feet per minute. The block was fastened to a load measuring device which indicated the resistance the block offered to the film being pulled underneath it. The coefficient of friction was then calculated by dividing the weight of the block into the observed load. Films of polyethylene having coefficients of friction in excess of about 0.6 cause difficulty when used with automatic packaging machinery. As can be observed from the data set out in the table, the addition of small amounts of the subject glyceryl monoesters to polyethylene decreased the coefficient of friction of polyethylene below 0.6

The blocking values of the polyethylene films were determined by ASTM, D–884–48 with the condition being 50° C. and 1 p.s.i. pressure. The value under "as extruded" was the index of the film as received from the extruder. The value under "storage" was the blocking index after a month's storage. The blocking index was modified from the ASTM test as follows:

| Blocking Index | Description |
|---|---|
| 0 | Does not block at any point. |
| 1 | Very, very slight blocking. Will fall apart under own weight with no shaking. Blocks less than 25% of total surface. |
| 2 | Same as No. 1 but blocks greater than 25% of total surface. |
| 3 | Very slight blocking. Will fall apart with very slight shaking. Easily slid apart with fingers. |
| 4 | Slight blocking. Will fall apart with slight shaking, easily slid apart with fingers. |
| 5 | Blocking. Must be pulled apart or shaken hard. Can be slid apart with fingers with some difficulty. |
| 6 | Badly blocked. Must be pulled apart. Cannot be slid apart with fingers. When sheets are held in each hand and pulled apart the polyethylene sheets make greater than a 30° angle with the horizontal. |
| 7 | Very badly blocked. Same as No. 6 except the angle is less than 30° with horizontal when the two sheets are pulled apart with the blocked section hanging vertically. |

The compositions of the invention have many important uses which relate principally to the ease of separating contacting surfaces of polyethylene. These surfaces may be flat, or in a stack of sheets, roll of film, articles of other shapes as in granules, or other forms of polyethylene which, in the absence of the additive of the invention, would adhere.

Although the invention has been described in considerable detail with reference to certain preferred embodiments thereof, it will be understood that variations and modifications can be effected within the spirit and scope of the invention as described hereinabove and as defined in the appended claims.

We claim:

1. An unsupported solid film 0.5 to 100 mils in thickness having substantially reduced film-to-film blocking characteristics and reduced coefficient of friction suitable for use in packaging, said film comprising solid polyethylene having an average molecular weight of at least 20,000 and 0.01–0.5% by weight based on the polyethylene of a glyceryl monoester composition consisting essentially of glyceryl monoesters of higher fatty acids having 16–18 carbon atoms with at least 40% by weight of the glyceryl monoesters being glyceryl monoesters of unsaturated hydroxy-free fatty acids containing 18 carbon atoms.

2. An unsupported solid film as described in claim 1 wherein the glyceryl composition consists essentially of a mixture of monoesters having the fatty acids of soybean oil.

3. An unsupported solid film as described in claim 1 wherein the glyceryl composition consists essentially of a mixture of monoesters having the fatty acids of corn oil.

4. An unsupported solid film as described in claim 1 wherein the glyceryl composition consists essentially of glyceryl monooleate.

References Cited in the file of this patent

UNITED STATES PATENTS

| 2,462,331 | Myers | Feb. 22, 1949 |
| 2,628,205 | Shoemaker | Feb. 10, 1953 |